United States Patent
Hess et al.

(10) Patent No.: US 8,166,343 B2
(45) Date of Patent: Apr. 24, 2012

(54) PROCESSING SYSTEM HARDWARE DIAGNOSTICS

(75) Inventors: Gary L. Hess, Enfield, CT (US); Kanwalpreet Reen, Bristol, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 169 days.

(21) Appl. No.: 12/628,591

(22) Filed: Dec. 1, 2009

(65) Prior Publication Data
US 2011/0131449 A1 Jun. 2, 2011

(51) Int. Cl.
G06F 11/27 (2006.01)
(52) U.S. Cl. .......................... 714/30; 714/27; 714/48
(58) Field of Classification Search .............. 714/27, 714/30, 48
See application file for complete search history.

(56) References Cited

U.S. PATENT DOCUMENTS

| | | | |
|---|---|---|---|
| 4,811,275 A * | 3/1989 | Balogh et al. .............. 710/316 |
| 7,724,030 B1 * | 5/2010 | McNeil et al. .............. 326/40 |
| 2002/0078412 A1 * | 6/2002 | Wang et al. .............. 714/732 |
| 2002/0173926 A1 * | 11/2002 | McCord .............. 702/120 |
| 2003/0126524 A1 * | 7/2003 | Kashihara et al. .............. 714/718 |
| 2004/0267482 A1 * | 12/2004 | Robertson et al. .............. 702/118 |
| 2005/0021260 A1 * | 1/2005 | Robertson et al. .............. 702/75 |
| 2005/0071108 A1 * | 3/2005 | Kulidjian et al. .............. 702/117 |
| 2005/0209877 A1 * | 9/2005 | Moroney et al. .............. 705/1 |
| 2006/0200720 A1 * | 9/2006 | Grimme et al. .............. 714/738 |
| 2007/0260823 A1 * | 11/2007 | Dickinson et al. .............. 711/153 |
| 2007/0260953 A1 * | 11/2007 | Armagnat .............. 714/727 |
| 2008/0148101 A1 * | 6/2008 | Thornley et al. .............. 714/30 |
| 2008/0162998 A1 * | 7/2008 | Likovich et al. .............. 714/28 |
| 2009/0119052 A1 * | 5/2009 | Robertson et al. .............. 702/106 |
| 2009/0319828 A1 * | 12/2009 | Thornley et al. .............. 714/30 |
| 2010/0007366 A1 * | 1/2010 | Watanabe et al. .............. 324/763 |
| 2010/0169728 A1 * | 7/2010 | Dehnert et al. .............. 714/731 |

OTHER PUBLICATIONS

C.J. Clark and Mike Ricchetti, "A Code-less BIST Processor for Embedded Test and in-system configuration of Boards and Systems," International Test Conference 2004, Charlotte, NC, Oct. 26-28, 2004.
Daniel Milton, Sachin Dhingra, and Charles E. Stroud, "Embedded Processor Based Built-In Self-Test and Diagnosis of Logic and Memory Resources in FPGAs," Proceedings of 2006 International Conference on Embedded Systems & Applications, pp. 87-93, Las Vegas, USA, 2006.

* cited by examiner

*Primary Examiner* — Scott Baderman
*Assistant Examiner* — Chae Ko
(74) *Attorney, Agent, or Firm* — Kinney & Lange, P.A.

(57) ABSTRACT

A method for diagnosing hardware failures in a data processing system includes a configuring a portion of a programmable logic device to create a state machine. The state machine tests a communication bus and a plurality of component devices connected by the communication bus and identifies the test failures. The state machine communicates the test information to external test equipment. The communication bus is used in the operation of the data processing system and the testing includes tests at full clock speed of the data processing system.

19 Claims, 2 Drawing Sheets

PROCESSING SYSTEM HARDWARE DIAGNOSTICS

BACKGROUND

The present invention relates to diagnosing failures in data processing systems. In particular, the invention relates to built-in, self-test capabilities for data processing system hardware.

Built-in, self-test capabilities have become essential as the design of data processing systems has become more complex. Historically, with simple systems made up of relatively few individual components, each of minimal complexity, testing a data processing system to find a failed component was a simple matter of testing across each component. As system complexity increased with greater levels of integration, access to test points across each component disappeared and the number of components to test to diagnose a data processing system problem skyrocketed.

Even in systems where test points remain, today's high-speed, high-performance data processing systems are difficult to test using an external logic analyzer because of the long lead lines from analyzer to circuit. The long lead lines make accurate testing, at full system clock speed, almost impossible. This is problematic, because some data processing system problems only appear when tested at full system clock speed. In addition, although some useful test information can be obtained with external testing, this becomes very difficult once a data processing system is in the field. Units must be disassembled and protective covers removed to gain access to the test points, increasing the likelihood of inducing further damage to the data processing system. The solution has been to build in an automated capability, such that the system could test itself and report failures.

Built-in, self-test designs generally fall into one of two approaches: a software-based capability or a JTAG boundary scan capability. Both approaches are useful, but have serious drawbacks. Software-based approaches use code stored in the memory used by the central processing unit (CPU) and the CPU itself to test system components and identify and report failures. The major drawback is that if the CPU is not working correctly and is itself part of the problem, the hardware diagnosis process stops or becomes severely limited. In addition, the CPU can not thoroughly test itself or its associated memory because it requires those resources to run the test software.

Boundary scan approaches avoid the working CPU requirement of the software approach by creating a separate test bus to circumvent the communication bus used within the data processing system. Boundary scan is often referred to by the group that began developing a standard for using boundary scans, Joint Test Action Group (JTAG). JTAG is the common name for the IEEE 1149.1 standard, which defines a test bus and defines test ports that components must have to interface with the test bus. As typically implemented, a programmable logic device with the built-in, self-test JTAG firmware is installed in the data processing system and uses the test bus to test some of the data processing system components. Only components designed to interface with the test bus can be tested by the boundary scan method. Such components are commonly referred to JTAG enabled. This is a major limitation on the JTAG boundary scan approach. Many components in a data processing system are not JTAG enabled and, as a result, are not tested by the built-in test, requiring a return to external logic analyzer testing and its attendant problems (if test points are even available). This severely limits the usefulness of the JTAG boundary scan approach in diagnosing data processing system failures. In addition, the JTAG boundary scan approach does not test the communication bus directly, but only through JTAG enabled components, limiting coverage of communication bus testing. For example, a continuity failure at a component not JTAG enabled would not be detected by the boundary scan.

Finally, the JTAG boundary scan test often is not able to operate at full clock speed of the data processing system. As mentioned above, some data processing system problems only appear when tested at full system clock speed. Using the JTAG boundary scan approach makes detection of such high-speed, high-performance system failures impossible.

SUMMARY

One embodiment of the present invention includes a method for diagnosing hardware failures in a data processing system including a programmable logic device. A portion of the programmable logic device is configured to create a state machine. The state machine tests a communication bus and a plurality of component devices connected by the communication bus and identifies the test failures. The state machine communicates the test information to external test equipment. The communication bus is used in the operation of the data processing system and the testing includes tests at full clock speed of the data processing system.

Another embodiment of the present invention, a system for diagnosing hardware failures in a data processing system, includes a plurality of component devices and a programmable logic device connected by a communication bus. A portion of the programmable logic device is configured to create a state machine for testing and identifying hardware failures and to produce test failure information. A test interface is connected to the programmable logic device for communicating test failure information from the state machine to external test equipment. The communication bus is used for operation of the data processing system and for testing and identifying hardware failures by the state machine. The state machine testing includes tests at full clock speed of the data processing system.

DETAILED DESCRIPTION

Figure 1:
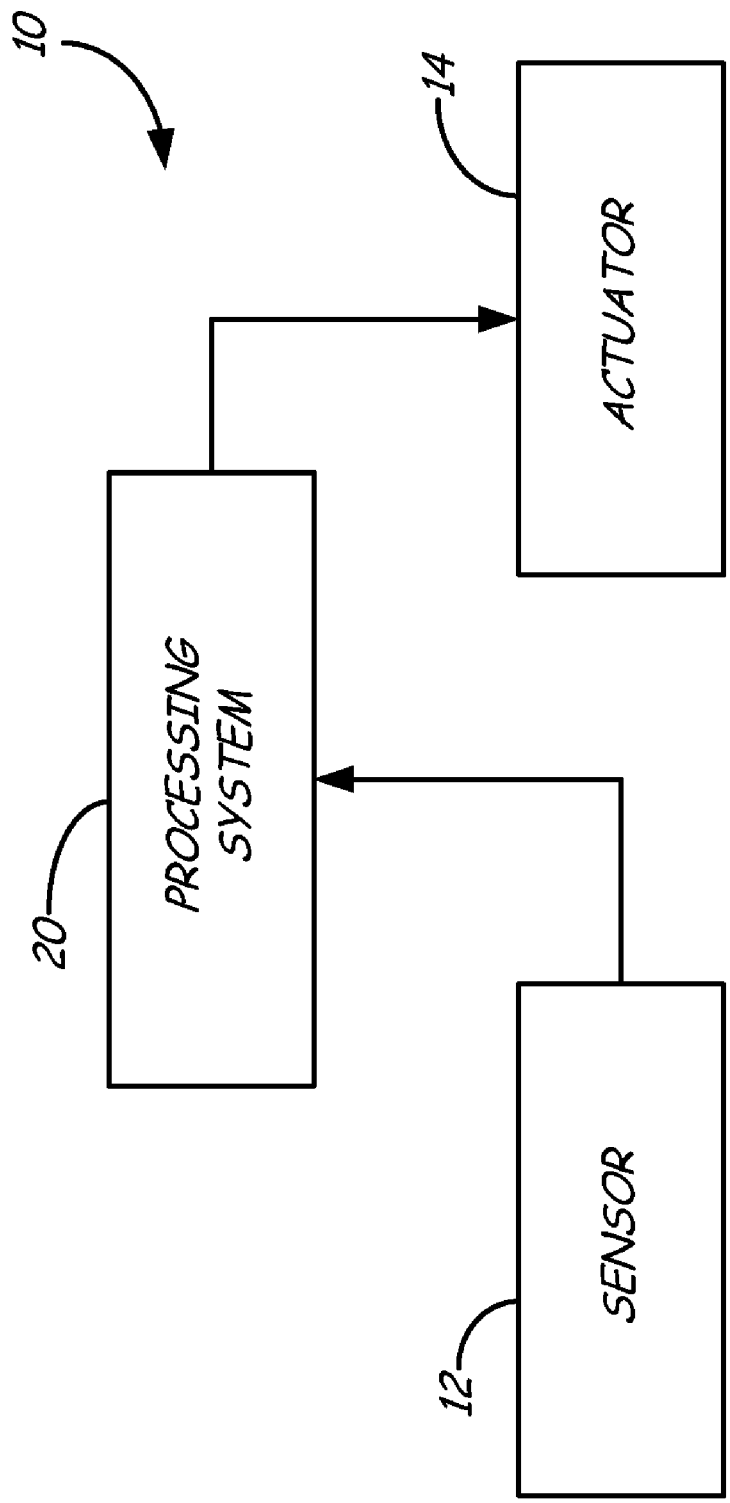
FIG. 1 is a block diagram of control system which utilizes the present invention.

FIG. 1 is a block diagram of control system which utilizes the present invention. FIG. 1 shows a control system 10, including a sensor 12, an actuator 14, and a data processing system 20 of the present invention. Sensor 12 is any type of sensor producing an analog or digital output signal in response to a condition to be sensed, including, for example, a linear position sensor, a rotary position sensor, and a temperature sensor. Actuator 14 is any type of electrical component producing an effect based on an input signal, including, for example, a motor, a valve, or piezoelectric device.

Sensor 12 and actuator 14 are both electrically connected to data processing system 20. In operation, sensor 12 produces a signal in response to the condition to be sensed and sends the information to data processing system 20. Data processing system 20 processes the data represented by the input signal and generates a specific output signal. Data processing system 20 sends the output signal to actuator 14, which responds with the appropriate effect on the condition being sensed. The control system 10 responds to changes in the condition to be controlled and makes automatic adjustments to keep the condition to be controlled within a desired range. In the field, control systems 10 operate in a variety of locations under a variety of conditions. Locations are often difficult to access and ambient conditions are often hazardous to the internal components of sensor 12, actuator 14 and data processing system 20.

Figure 2:
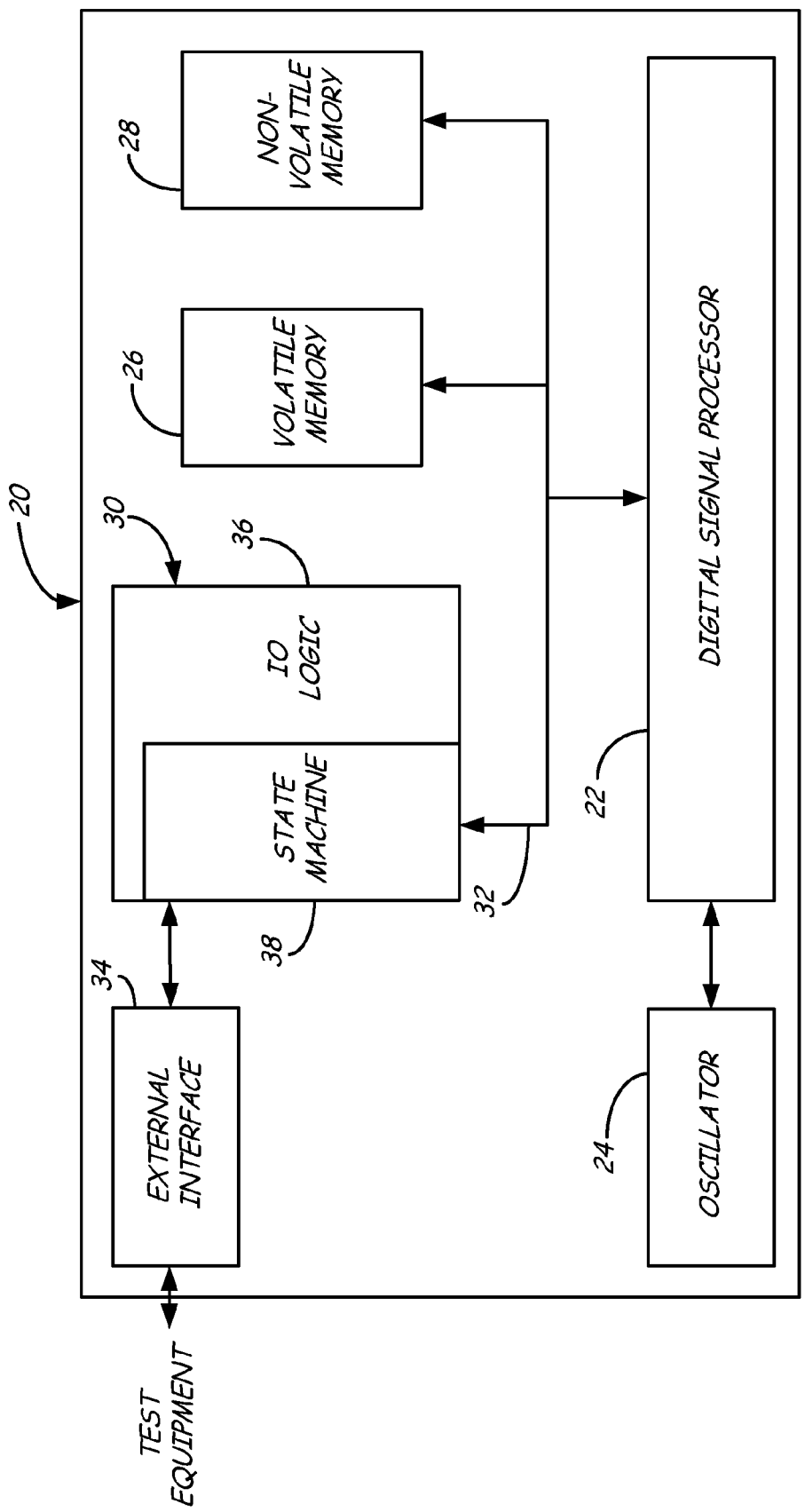
FIG. 2 is a block diagram of a data processing system with a built-in, self-test capability for diagnosing hardware failures of the present invention.

FIG. 2. is a block diagram of the data processing system 20 with built-in, self-test capability for diagnosing hardware failures of the present invention. As shown in FIG. 2, data processing system 20 component devices include digital signal processor (DSP) 22, oscillator 24, volatile memory 26, non-volatile memory 28, programmable logic device (PLD) 30, communication bus 32, and external interface 34. PLD 30 includes IO logic 36 and state machine 38. Volatile memory 26 is any of the various memory storage devices that lose stored data values if power is no longer applied, for example, dynamic random access memory and static random access memory. Non-volatile memory 28 is any of the various memory storage devices that maintain stored data values even if power is no longer applied, for example, electrically erasable programmable read-only memory (EEPROM) and flash memory. PLD 30 is any of the larger programmable logic arrays, for example field programmable gate array (FPGA) and complex programmable logic device (CPLD). Communication bus 32 is any of the standard local computer bus protocols, for example, Peripheral Component Interconnect (PCI), Low-Voltage Differential Signaling (LVDS), and VERSAmodular Eurocard (VME).

Oscillator 24 is connected to DSP 22. DSP 22, volatile memory 26, non-volatile memory 28, and PLD 30 connect to communication bus 32. PLD 30 is also connected to external interface 34. Connections to external devices, such as sensor 12, actuator 14 (shown in FIG. 1), and external test equipment, are made through external interface 34.

The built-in, self-test capability of the present invention is initiated when PLD 30 is configured through external interface 34 with logic instructions necessary to test components attached to communication bus 32. This creates state machine 38. The proportion of PLD 30 occupied by state machine 38 will vary depending on the complexity of data processing system 20. This firmware programming is ideally completed at an early stage in the manufacture of data processing system 20 to take full advantage of the self-test capability, but firmware programming of state machine 38 can also be installed and updated throughout the life of data processing system 20.

Once configured, a signal from the external test equipment through external interface 34 to state machine 38 triggers the state machine 38 to test data processing system 20. State machine 38 tests include a test sweep employing input/output test patterns directed toward external interface 34 to verify the health of external interface 34. State machine 38 also tests I/O logic 36 by writing a value to all memory locations comprising I/O logic 36 and then reading back a value from each memory location. Discrepancies between the two values for each location are noted as errors and information on the test failure location and test failure mode of the errors in I/O logic 36 are reported by state machine 38 to the external test equipment through external interface 34. State machine 38 checks the health of communication bus 32 by checking for shorts or opens for every address of communication bus 32. Volatile memory 26 and non-volatile memory 38 are tested by state machine 38 writing to and reading from each memory location over communication bus 32, flagging and reporting errors as described above for I/O logic 36. State machine 38 tests DSP 22 and oscillator 24 over communication bus 32 using various modes and test patterns to gauge the health of DSP 22 and oscillator 24, reporting details of any failures, including test failure location and test failure mode, to the external test equipment through external interface 34.

In the present invention, state machine 38 is able to test all component devices of data processing system 20 connected to communication bus 32 quickly and efficiently. No separate test bus is required, in contrast to JTAG boundary scan testing. Because the communication bus is used, not a separate test bus, all components can be tested, not just those that are JTAG enabled. For reasons of cost, performance, and availability, many component devices are not JTAG enabled. With the present invention, such component devices are not excluded from the built-in test. The result is a more complete, effective diagnosis of hardware failures.

The present invention also permits testing of component devices at full clock speed of the data processing system 20. Oscillator 24 provides the clock speed for data processing system 20. Because the state machine 38 tests DSP 22 and oscillator 24 over communication bus 32, communication bus 32 and the component devices connected to communication bus 32 can be tested at full clock speed. In contrast, JTAG boundary scan is not able to operate at full clock speed for many of today's high-speed, high-performance data processing systems. With the present invention, data processing system hardware failures that only appear at full system clock speed are not excluded from the built-in test.

The present invention also overcomes a major drawback of a software-based approach to implementing built-in self-test. Because all testing is driven by state machine 38, proper operation of DSP 22 is not necessary to evaluate the health of the hardware for data processing system 20. A great deal of hardware diagnostics on component devices and on DSP 22 itself can be done even if DSP 22 is not working correctly. This saves a great deal of time in troubleshooting because multiple failures can be detected simultaneously, not just after a failed DSP is replaced.

Data processing system 20 with a built-in self-test capability for diagnosing hardware failure of the present invention permits much more complete troubleshooting of hardware failures through external interface 34. Everything tested with a JTAG boundary scan approach or a software-based approach is tested with the present invention, and much more, as described above. As a result, field testing can be done quickly, efficiently and completely through test interface 34 with no need to remove protective covers for test purposes. Data processing system 20 is not exposed to potentially damaging activities or hazardous environmental conditions.

The form of data processing system 20 will vary depending on the level of integration desired for a particular application. In systems for applications requiring small size, data process system 20 is constructed on a single integrated circuit. In systems for applications of great complexity where size is not an overriding concern, data processing system 20 is constructed over several printed circuit boards, connected by communication bus 32 which necessarily extends to each board. In systems with intermediate requirements, data processing system 20 is constructed on a single printed circuit board. Also, although FIG. 2 illustrates only a single unit of each of various types of component device (DSP, PLD, oscillator, etc.), the present invention contemplates multiple quantities of each type of component device as necessary to meet the performance requirements of data processing system 20.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for diagnosing hardware failures in a data processing system comprising a programmable logic device, a plurality of component devices connected by a communication bus, and an external test interface, the method comprising:
configuring a portion of the programmable logic device to create a state machine;
testing the communication bus using the state machine;
identifying test failures of the communication bus;
testing the plurality of component devices using the state machine and the communication bus;
identifying test failures of the plurality of component devices; and
communicating test failure information to external test equipment using the external test interface;
wherein the communication bus is used in the operation of the data processing system; and wherein the testing comprises tests at full clock speed of the data processing system.

2. The method of claim 1 wherein the plurality of component devices comprises devices that are not JTAG enabled.

3. The method of claim 1 further comprising:
testing the external test interface using the state machine; and
identifying test failures of the external test interface.

4. The method of claim 1 wherein the communication bus is a PCI bus.

5. The method of claim 1 wherein the communication bus is a VME bus.

6. The method of claim 1 wherein the communication bus is a LVDS bus.

7. The method of claim 1 wherein the test failure information communicated to the external equipment comprises test failure location and test failure mode.

8. The method of claim 1 wherein only an integrated circuit comprises the data processing system.

9. The method of claim 1 wherein only a printed circuit board comprises the data processing system.

10. The method of claim 1 wherein a plurality of printed circuit boards comprise the data processing system.

11. The method of claim 2 wherein testing the communication bus comprises testing continuity between the plurality of component devices.

12. The method of claim 1 wherein the plurality of component devices comprises devices that are not connected by a test bus.

13. A method for diagnosing hardware failures in a data processing system comprising a programmable logic device, a plurality of component devices connected by a communication bus, and an external test interface, the method comprising:
configuring a portion of the programmable logic device to create a state machine;
testing a portion of the programmable logic device not configured to create the state machine using the state machine;
identifying test failures of the portion of the programmable logic device not configured to create the state machine;
testing the communication bus using the state machine;
identifying test failures of the communication bus;
testing the plurality of component devices using the state machine;
identifying test failures of the plurality of component devices; and
communicating test failure information to external test equipment using the external test interface;
wherein the communication bus is used in the operation of the data processing system; and wherein the testing comprises tests at full clock speed of the data processing system.

14. The method of claim 13 wherein testing a portion of the programmable logic device not configured to create the state machine comprises:
writing a value to all memory locations in the portion of the programmable logic device not configured to create the state machine;
reading a value from all memory locations in the portion of the programmable logic device not configured to create the state machine; and
verifying that, for each of the memory locations in the portion of the programmable logic device not configured to create the state machine, the value read from the memory location matches the value written to the memory location.

15. The method of claim 13 wherein the programmable logic device comprises a field programmable gate array.

16. A system for diagnosing hardware failures in a data processing system, the system comprising:
a plurality of component devices;
a programmable logic device having a portion that is configured to create a state machine for testing and identifying hardware failures to produce test failure information, wherein the testing comprises tests at full clock speed of the data processing system;
a test interface connected to the programmable logic device for communicating the test failure information from the state machine to external test equipment and for communicating test requests from the external test equipment to the state machine; and
a communication bus connecting the plurality of component devices to each other and to the programmable logic device for operation of the data processing system and for the testing and identifying of hardware failures of the plurality of component devices by the state machine of the programmable logic device.

17. The system of claim 16 wherein the plurality of component devices comprises devices that are not JTAG enabled.

18. The system of claim 16 wherein the hardware failures identified by the state machine comprise failures internal to the plurality of component devices, failures internal to the programmable logic device, and continuity failures between the plurality of component devices and the communication bus; wherein failures internal to the programmable logic device do not include failures from the portion of the programmable logic device configured to create the state machine.

19. The system of claim 16 wherein the test failure information comprises test failure location and test failure mode.

* * * * *